(12) United States Patent
Sohn

(10) Patent No.: US 9,939,078 B2
(45) Date of Patent: Apr. 10, 2018

(54) SHUT-OFF VALVE FOR LIQUID OR GASEOUS MEDIA

(71) Applicant: Otto Egelhof GmbH & Co. KG, Fellbach (DE)

(72) Inventor: Juergen Sohn, Esslingen (DE)

(73) Assignee: OTTO EGELHOF GMBH & CO. KG, Fellbach (DE)

( * ) Notice: Subject to any disclaimer, the term of this patent is extended or adjusted under 35 U.S.C. 154(b) by 12 days.

(21) Appl. No.: 14/443,893

(22) PCT Filed: Nov. 12, 2013

(86) PCT No.: PCT/EP2013/073557
§ 371 (c)(1),
(2) Date: May 19, 2015

(87) PCT Pub. No.: WO2014/076051
PCT Pub. Date: May 22, 2014

(65) Prior Publication Data
US 2015/0316164 A1   Nov. 5, 2015

(30) Foreign Application Priority Data

Nov. 19, 2012   (DE) .................... 20 2012 104 460 U

(51) Int. Cl.
*F16K 31/02*   (2006.01)
(52) U.S. Cl.
CPC .................................. *F16K 31/025* (2013.01)
(58) Field of Classification Search
CPC ................................ F16K 31/025; F16K 1/34

USPC .......................... 251/11, 319, 66, 68, 129.06
See application file for complete search history.

(56) References Cited

U.S. PATENT DOCUMENTS

| | | | |
|---|---|---|---|
| 2,433,493 A * | 12/1947 | Turner | .................. F16K 31/025 236/68 R |
| 3,835,659 A | 9/1974 | McBride, Jr. | |
| 3,974,844 A * | 8/1976 | Pimentel | .................. F03G 7/065 137/1 |

(Continued)

FOREIGN PATENT DOCUMENTS

| DE | 19610865 A1 | 10/1996 |
|---|---|---|
| DE | 102004049790 B4 | 5/2007 |

(Continued)

*Primary Examiner* — Umashankar Venkatesan
(74) *Attorney, Agent, or Firm* — Kriegsman & Kriegsman

(57) ABSTRACT

Shut-off valve for liquid or gaseous media including a valve housing having at least one passage opening connecting an inlet opening to an outlet opening, a valve seat arranged on the valve housing and surrounding the passage hole and can be closed by a valve closing element lying directly in contact, which are arranged in a control chamber formed in the valve housing between the inlet opening and the outlet opening, a drive, which can be connected to the valve housing and which actuates the valve closing element to open or close the passage hole, and a restoring element, which acts against a closing or opening motion of the valve closing element, wherein the drive has at least one setting element of a shape-memory alloy to actuate the opening or closing motion of the valve closing element, and the drive is separated from the control chamber by a sealing element.

13 Claims, 3 Drawing Sheets

(56) References Cited

U.S. PATENT DOCUMENTS

Figure 1:
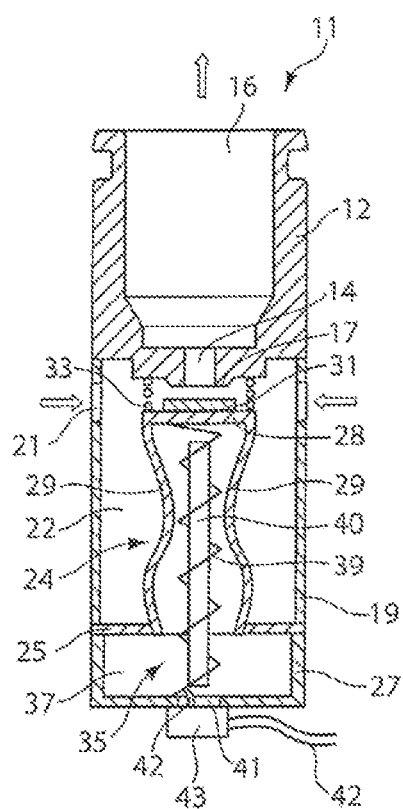

| | | | | |
|---|---|---|---|---|
| 4,836,496 A | * | 6/1989 | Abujudom | F16K 31/025 251/11 |
| 5,622,413 A | * | 4/1997 | Kim | B60T 8/172 251/11 |
| 6,843,465 B1 | * | 1/2005 | Scott | F16K 31/025 251/129.06 |
| 9,328,838 B2 | * | 5/2016 | Kollar | F16K 31/025 |
| 2010/0273078 A1 | | 10/2010 | Takahashi | |
| 2011/0088792 A1 | * | 4/2011 | Ito | F16K 31/025 137/468 |
| 2012/0025113 A1 | * | 2/2012 | Stadelbauer | F16K 31/002 251/11 |
| 2015/0252794 A1 | * | 9/2015 | Kraus | F16K 1/34 60/527 |

FOREIGN PATENT DOCUMENTS

| | | |
|---|---|---|
| DE | 102005060217 B4 | 10/2008 |
| DE | 202010010747 U1 | 11/2010 |
| JP | S6119368 A | 1/1986 |
| JP | S6235185 A | 2/1987 |
| JP | H0229378 U | 2/1990 |
| JP | H02125188 A | 5/1990 |
| JP | H1163739 A | 3/1999 |
| WO | 0250460 A1 | 6/2002 |

\* cited by examiner

SHUT-OFF VALVE FOR LIQUID OR GASEOUS MEDIA

The invention relates to a shut-off valve for liquid or gaseous media according to the preamble of claim 1.

Such a shut-off valve for liquid or gaseous media is known from DE 10 2004 049 790 B4. This shut-off valve has a valve housing having a passage opening which connects an inlet opening to an outlet opening. A valve seat encloses the passage opening and is arranged on the valve housing, which is able to be actuated by a valve closing member. For this, an electromagnetic drive is provided which opens or closes the valve closing member depending on a current pulse. These shut-off valves may be able to be introduced into a connector block that is designed as a so-called "dual-port housing". Such switching valves may also be part of an expansion valve and be introduced into a so-called "four-port housing".

Such shut-off valves have proved to be fundamentally expedient. However, the coil used for the drive has high switching-on and shut-off pulses which are undesirable for specific applications. Moreover, rare earths are used as the material for these coils, which are becoming increasingly more expensive due to scarcity of resources.

A compressed air valve having a valve housing is known from DE 10 2005 060 217 B4, in which an opening and closing movement of a valve is activated with a wired or band-shaped SMA element. Furthermore, a thermostat valve for underfloor heating is known from DE 196 10 065 A1, which is also driven by a setting element made from a shape memory alloy. The same applies for a valve according to U.S. Pat. No. 3,835,659. In all of the aforementioned specifications, the setting elements made from the shape memory alloy are provided within the medium that is to be regulated or are flowed around by this, such that the temperature of the medium that is to be controlled has a direct impact on the shape memory alloy of the setting element.

A drive for a microvalve having a shape memory alloy is provided from DE 20 2010 010 747 U, in which a membrane is fixed between the valve closing member and the passage hole. This membrane acts as a sealing element in a valve closing member arranged in a closed position in order to seal off the valve seat at the passage opening. This has the disadvantage that the valve has to actuate the membrane during opening and closing and press it into the valve seat in order to achieve a closing of the microvalve. For this, a large amount of force is required on the one hand, and on the other increased wear of the seal is provided due to contusion, in particular also when aggressive media are used.

The object of the invention is to propose a shut-off valve that is to maintain the hitherto existing functions of the aforementioned shut-off valves and to avoid the use of rare earths, as well as high switching-on and shut-off pulses.

This object is solved according to the invention by the features of claim 1. Further advantageous embodiments and developments are specified in the further claims.

An alternative motion drive is proposed by the embodiment of a shut-off valve having a drive for the activation of an opening or closing movement of the valve closing member in which at least one setting element made from a shape memory alloy is used which counteracts a restoring element and the separation of this drive by a sealing element to a regulation space which is located between the inlet opening and the passage hole or the passage hole and the outlet opening of the valve housing, said motion drive dispensing with the drive with a magnetic coil. This arrangement according to the invention may also involve weight saving compared to this. Moreover, low inrush and breaking currents accrue due to the control of the drive by means of a setting element made from a shape memory alloy, wherein the reaction and switching times may remain adhered to. The use of the sealing element with the valve closing member arranged thereon in conjunction with the drive furthermore has the advantage that this sealing element shields the gaseous or liquid medium from the drive, such that this setting element made from the shape memory alloy is able to be actuated independently of the state of pressure and/or temperature and/or type of the liquid or gaseous medium and the hitherto existing valve seat arrangement of the valve closing member remains in the valve seat.

A preferred embodiment of the invention provides that the valve housing has a sleeve-like housing section which encloses the passage hole and receives the sealing element at an end located opposite the passage hole and closes the regulation space. The regulation space is, on the one hand, delineated by the valve housing with the passage hole, as well as by the sleeve-like housing section arranged thereon which has at least one inlet opening that guides the liquid or gaseous medium to the passage hole. The end of the sleeve-like housing section opposite the valve housing is closed by the sealing element, i.e. the regulation space located therebetween can be hermetically sealed. This arrangement furthermore has the advantage that liquid or gaseous media cannot escape outwards into the environment.

The sealing element is preferably designed as a bellows element which is fastened to the valve housing, in particular the sleeve-like housing section, and whose moveable base is allocated to the passage hole. The sealing element can thus be simultaneously used as part of the valve closing member. The drive may also at least partially extend within the bellows element up to the base in order to control the valve closing member. A compact and space-efficient arrangement can thus be created.

The sealing element designed as a bellows element may advantageously receive a cover at an end opposite the base, such that a closed working space is formed in which the drive is arranged. The cover preferably touches the fastening section of the sealing element, such that the interior of the bellows element on the one hand and the interior of the cover on the other form the closed working space. The drive arranged therein can thus be protected from external influences such as environmental influences. This working space is free from the medium that is to be controlled.

The sealing element and the cover as well as, preferably, a drive arranged in the working space advantageously form a drive module which is able to be assembled in a simple manner on the valve housing or on the sleeve-like housing section of the valve housing. A simple exchange can thus also be enabled. Working modules that are adapted to the respective switching task may furthermore be provided, used and/or exchanged.

A further preferred embodiment of the shut-off valve provides that the cover is able to be fastened to the sleeve-like housing section by fixing a fastening section of the sealing element. This enables a simple sealing arrangement of the regulation space on the one hand and the working space on the other, such that a medium-tight separation is also provided.

The sealing element may also be able to be connected in a firmly bonded manner to the valve housing or sleeve-like housing section with a fastening section. The regulation space is therefore also sealed to be medium-tight and the drive is at least partially able to be inserted into the sealing element.

At least one connection opening for control lines is provided on the cover sealing the working space. Further interfaces for this drive and the shut-off valve are not required, i.e. a simple sealing is possible for the supply of the control lines and a shielding of the working space is provided independently of the climatic operating conditions.

The valve housing and the sleeve-like housing section arranged thereon and preferably the cover arranged thereon are designed to be cylindrical and may be able to be inserted at least partially into a connector block. With such a design, the shut-off valve is formed as an installation unit or as an installation cartridge which is able to be inserted into the corresponding connector blocks or connecting housings. The connector blocks may be designed as dual or four-port housings such as are known from the prior art.

The drive comprises a tubular, hose-shaped, rod-shaped, cage-shaped or plate-shaped heating element which is allocated to the setting element. A control of the setting element consisting of a shape memory alloy can thus be provided in a simple manner.

A further preferred embodiment of the invention provides that the sealing element is designed as a setting element made from the shape memory alloy. This integrated arrangement of both components into a single component has the advantage that a reduction in components is enabled.

The sealing element has a valve closing member on its outer side of the base pointing towards the valve seat. This enables a constructively simple and space-saving arrangement.

Such a valve closing member can preferably be designed to be disc-shaped and consist of plastic. A sealing element can thus be created in a simple manner.

The valve closing member is preferably formed as a plastic disc vulcanised onto the outer side of the base of the sealing element.

Figure 2:
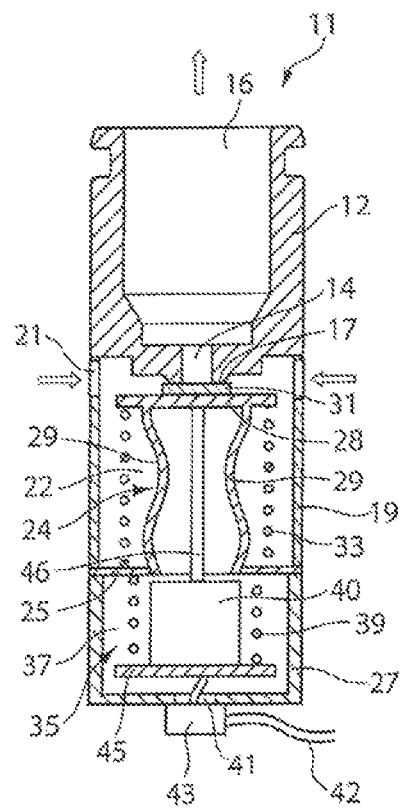
Figure 3:
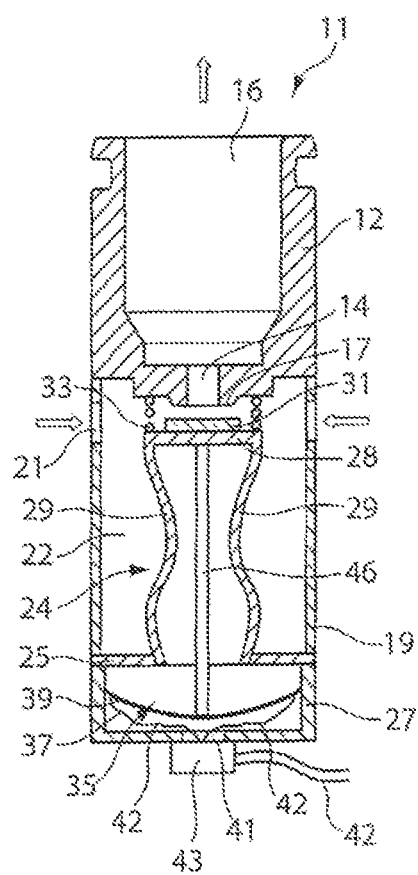
Figure 4:
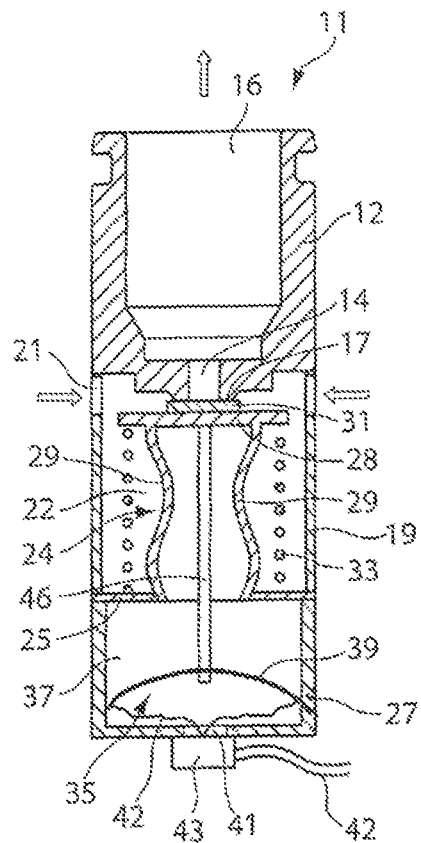
Figure 5:
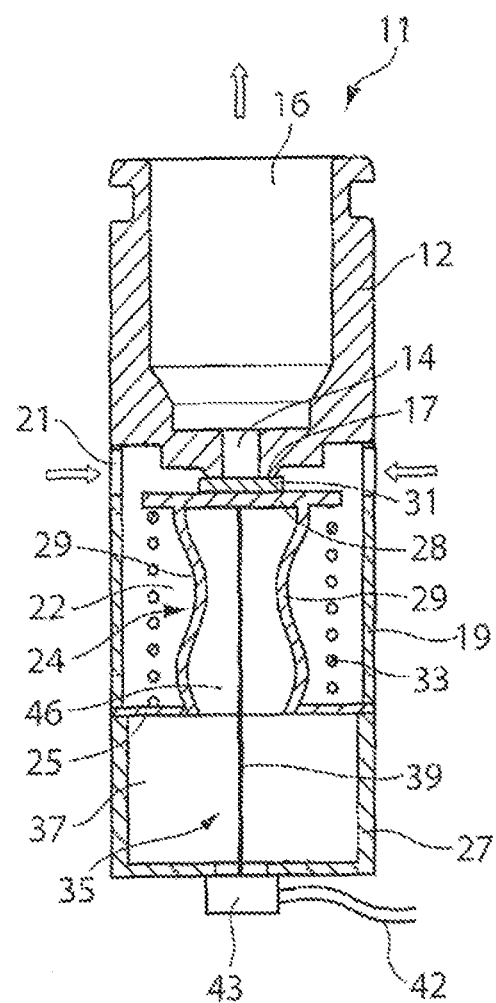

The invention as well as further advantageous embodiments and developments of the same are described and illustrated in greater detail below with the aid of the examples depicted in the drawings. The features to be gleaned from the description and the drawings may be applied according to the invention individually or as a multiplicity in any combination. Shown are:

FIG. 1 a schematic sectional depiction of a first embodiment according to the invention of a shut-off valve, FIG. 2 a schematic sectional depiction of an alternative embodiment of the shut-off valve to FIG. 1, FIG. 3 a schematic sectional depiction of an alternative embodiment of the shut-off valve to FIG. 1, FIG. 4 a schematic sectional depiction of an alternative embodiment of the shut-off valve to FIG. 2, and FIG. 5 a schematic sectional depiction of a further alternative embodiment of the shut-off valve to FIG. 2.

A schematic sectional depiction of a first embodiment of a shut-off valve 11 according to the invention is shown in FIG. 1. This shut-off valve 11 is designed as a so-called NO valve (Normally Open valve), the function of which shall be illustrated below.

The shut-off valve 11 comprises a valve housing 12 which has a passage hole 14 flowing into an outlet opening 16. A valve seat 17 is arranged on an opposite end of the passage hole 14, which can be, for example, formed as a crater-like bulge. A sleeve-like housing section 19 is furthermore provided on the valve housing 12. This can be arranged as a single piece on the valve housing 12. This may alternatively also be attached to the valve housing 12 by a releasable connection such as a screw connection, or by a firmly bonded connection. This sleeve-like housing section 19 has at least one inlet opening 21, through which a liquid or gaseous medium is guided into a regulation space 22. This regulation space 22 is delineated on one side by a sealing element 24 and by the valve housing 12 on the other side, as well as the sleeve-like housing section 19 located therebetween.

The sealing element 24 is, for example, formed to be bellows-like and has a fastening section 25 which touches the sleeve-like housing section 19. This can be connected in a firmly bonded manner to the sleeve-like housing section 19 or can be fastened to the sleeve-like housing section 19 by clamping with a cover 27. The sealing element 24 can, for example, consist of stainless steel, brass, copper or similar.

The sealing element 24 has a base 28 opposite the fastening section 25, said base being spaced apart from the fastening section 25 by a cylindrical bellows section 29. A valve closing member 31 is arranged on an outer side of the base 28, said member being able to be transferred into a closed position by the sealing element 24 by the valve closing member 31 resting on the valve seat 17 and closing the passage hole 14. In a starting position of the shut-off valve 11, which represents an open position of the valve closing member 31, the valve closing member 31 is arranged at a distance from the valve seat 17 of the passage hole 14, such that the medium can flow into the regulation space 22 via the inlet opening 21 and from there arrives at the outlet opening 16 through the passage hole 14.

The valve closing member 31 is preferably designed as a disc-shaped or plate-shaped sealing element which in particular consists of a vulcanised polymer. Alternatively, conical, cylindrical or spherical valve closing members 31 may be arranged and received on the base 28 of the sealing element 24.

A restoring element 33 is arranged in the regulation space 22 between the valve housing 12 and the base 28 of the sealing element 24, said restoring element counteracting a drive 35 for a setting movement of the valve closing member 31 into a closed position. This restoring element 33 can be designed as a compression spring. Alternatively, this restoring element 33 can also be arranged in the cylindrical bellows section 29 of the sealing element 24, wherein this is then advantageously designed as a tension spring and, for example, acts between the base 26 and the cover 27. Furthermore, the bellows section 29 can be designed as a restoring element 33. The bellows section 29 and the restoring element 33 may also be aligned next to each other or connected to each other to form a component.

The cover 27 and the sealing element 24 enclose an internally located working space 37 in which the drive 35 is arranged. This working space 37 can also be designed to be sealed off, such that no moisture or other damaging materials are able to penetrate in.

The drive 35 comprises a setting element 39 made from a shape memory alloy. This setting element is preferably formed as a spring element, in particular a compression spring element. A heating element 40 is allocated to this setting element 39, said heating element being able to be designed to be rod-shaped or tubular, for example. Alternatively, this can also be designed to be cage-shaped or plate-shaped, for example in the shape of a PTC element. The heating element 40 can furthermore be designed as a hot lacquer which is applied directly to the setting element 39. The setting element 39 advantageously extends from an interior of the base 28 of the sealing element 24 to the interior of the cover 27. The heating element 40 may be positioned within the setting element 39 and/or outside the setting element 39. A supply opening 41 for the control lines 42 is provided on the cover 27, said control lines being inserted into the cover 27 in a media-tight manner by means of a sealing element 43 such as a spout. The heating element 40 is controlled by these control lines 42, such that the shut-off valve 11 opens or closes by adjusting the length of the setting element 39. Alternatively, a control unit having a housing may also be allocated to the supply opening, said housing preferably sealing off the supply opening.

A setting element made from a shape memory alloy is preferably selected which operates in a temperature range that is higher than the maximum occurring environmental temperature, and a martensite structure is converted into an austenite structure. A CuAlBe alloy or similar can, for example, preferably be used in a temperature range of greater than 110° C.

In a starting position that is not depicted in greater detail, the valve closing member 31 is arranged with a gap to the valve seat 17. The restoring element 33 holds the shut-off valve 11 in an open position, i.e. the shut-off valve 11 is open (normally open). As soon as a control signal takes place via the control line 42, the setting element 39 is heated, such that the setting force of the setting element 39 is greater than the counteracting force of the restoring element 33, whereby the valve closing member 31 rests on the valve seat 17 and closes the passage hole 14. As soon as the control signal is switched off, the valve closing member 31 reverts to its starting position, since the restoring force of the restoring element 33 is greater than the setting force of the setting element 39.

According to one alternative embodiment, the sealing element 24 can be produced from a shape memory alloy, such that an additional setting element 39 can be dispensed with and the sealing element 24 also forms the setting element 39 at the same time.

An alternative embodiment of the shut-off valve 11 to FIG. 1 is depicted in FIG. 2. This shut-off valve 11 is designed as an NC valve (Normally Closed valve), i.e. this shut-off valve 11 is closed in the starting state and the valve closing member 31 closes the valve seat 17. As soon as a control signal is emitted via a control line 42, an activation of the setting element 39 takes place, whereby the valve closing member 31 is withdrawn from the valve seat 17. A deviating arrangement to the embodiment of the shut-off valve 11 described in FIG. 1 is constructively provided for this function, as is described below.

The setting element 39 touches the fastening section 25 of the sealing element 24, said setting element exerting a setting force in the direction towards the cover 27. The setting element 39 touches a holding element 45 located opposite the fastening section 25, to which holding element the heating element 40 is fastened. This holding element 45 is able to be changed by the setting element 39 in the position in the working space 37. The heating element 40 is in connection with the base 28 of the sealing element 24 via a tension rod 46, such that, during a setting movement of the setting element 39 in the direction towards the cover 27, the holding element 45 is pushed in the direction of the base of the cover 27 and at the same time the valve closing member 31 is withdrawn from the valve seat 17 via the tension rod 46. At the same time, the restoring element 33 which touches the base 28 of the sealing element 24 on one side and the fastening section 25 of the sealing element 24 on the other side is pressed together. The restoring element 33 is designed as a compression spring or as a closing spring that closes the shut-off valve 11 as soon as a control signal touches the heating element. Apart from that, the same embodiments as in FIG. 1 apply.

These embodiments of the shut-off valve 11 according to FIGS. 1 and 2 thus have on one side a closed regulation space 22 and on the other a closed working space 37 which are separated from each other in a media-tight manner, such that there are no leakages that have a disadvantageous impact.

The shut-off valve 11 can be able to be attached by a screw connection in a connector block that is not depicted in greater detail. Alternatively, a plug connection or other releasable connection may also be provided. The connector block can be designed as a "dual-port housing" or as a "four-port housing", such as a housing of an expansion valve. Furthermore, the passage hole having the valve seat arranged thereon can be provided in the valve housing as an exchangeable insert, such that, depending on the application, passage holes of different sizes and/or that differ from one another in terms of their contour are able to be introduced.

An alternative embodiment of the shut-off valve 11 to FIG. 1 is depicted in FIG. 3. In this embodiment, the drive 35 is depicted with deviation from the one in FIG. 1. The drive 35 according to FIG. 3 also comprises a setting element 39 made from a shape memory alloy which, for example, is designed as a curved rod, wire or spring element or shell element which is fastened to the cover 27, in particular to a side wall of the cover 27. This setting element 39 touches, or is close to, one end of the tension rod 46, which extends up to the inner side on the base 28 of the sealing element 24. Control lines 42 are provided for controlling the setting element 39, said control lines being supplied via the seal 43 and being controlled by a control element. The setting element 39 is energised to close the shut-off valve 11 and the setting element 39 is shortened by the heat generated thereby, whereby a setting movement of the tension rod 46 in the direction of the passage hole 14 is generated, whereby the valve closing member 31 is guided towards the system on the valve seat 17.

The setting element 39 and the tension rod 46 having control lines 42 attached thereto or contact points for attaching the control lines 42 may be provided as a structural unit which can be used both for a NO valve 11 according to FIG. 3 and for an NC valve according to FIG. 4.

In the alternative embodiment of the NC valve 11 depicted in FIG. 4, the control of the valve closing member 31 or the sealing element 24 in turn takes place by the setting element 39 and the tension rod 46 which are described in FIG. 2. Here, only the alignment of the curvature of the setting element 39 in the working space 37 is provided differently, which is closed by the cover 27. During the energising of the setting element 39, a lifting movement of the tension rod 46 is introduced, whereby the valve closing member 31 is withdrawn from the valve seat 17.

The connection between the setting element 39 and the tension rod 46 may be provided by a plug connection or a pivoting connection or suchlike, such that this structural unit is able to be used for both a NO valve 11 according to FIG. 3 and for an NC valve 11 according to FIG. 4 by a simple positioning of the setting element 39 or the arrangement thereof to the tension element 46.

Furthermore, the cover 27, the setting element 39 and the tension rod 46 and, potentially, a control unit that is in connection thereto, may form a structural unit. For example, the cover 27 can have receivers for the introduction of the setting element 39, wherein these receivers simultaneously form the contact between the control lines 42 and the setting element 39. The receivers are thus provided in such a way that the setting element 39 can be received both in a configuration according to FIG. 3 and according to FIG. 4.

In addition, the sealing element 24 may also still be attached to the cover 27 and may be designed as a structural unit.

A further alternative embodiment of a shut-off valve 11 to FIG. 2 is depicted in FIG. 5. This represents a further simplification of such a shut-off valve 11. The other end of the setting element 39 made from a shape memory alloy is fastened on one side to the base 28 of the sealing element 24 and on the other side to the base of the cover 27. An opening movement of the valve closing member 31 may be generated by energising the setting element 39. Furthermore, several wire-like setting elements 39 may be arranged in parallel. One or more wire-like setting elements may also be redirected once or several times.

In the embodiments depicted previously, the restoring element 33 is preferably provided in the regulation space 22. Alternatively, the restoring element 33 can also be stored in the working space 37, such that this restoring element 33 also comes into contact with the medium that is to be regulated.

The invention claimed is:

1. Shut-off valve for liquid or gaseous media, having a valve housing which has at least one passage opening which connects an inlet opening to an outlet opening, having a valve seat arranged on the valve housing and enclosing the passage hole, said valve seat being able to be closed by a directly adjacent valve closing member, which are arranged in a regulation space formed in the valve housing between the inlet opening and the outlet opening, having a drive that is able to be attached to the valve housing, said drive actuating the valve closing member for opening or closing the passage hole, and having a restoring element which counteracts a closing or opening movement of the valve closing member, wherein the drive has at least one setting element made from a shape memory alloy for controlling the opening or closing movement of the valve closing member, wherein the at least one setting element is wire-like, wherein the opening or closing movement of the valve closing member is generated by electrically energizing the setting element, wherein the drive is arranged to be separated from the regulation space by a sealing element, wherein the valve housing has a sleeve-like housing section in which the inlet opening is provided and which encloses the passage hole, and the sealing element is arranged on the end of the sleeve-like housing section of the valve housing opposite the passage hole and closes the regulation space, and wherein the sealing element is designed as a bellows element having a bellows section which is able to be fastened to the valve housing or sleeve-like housing section and whose moveable base, which is arranged on the bellows section, is allocated to the passage hole.

2. Shut-off valve according to claim 1, wherein the sealing element has a fastening section on an end located opposite a base, on which a cover is arranged, whereby a closed working space that is not flowed through by the liquid or gaseous medium is formed, in which the drive is arranged.

3. Shut-off valve according to claim 1, wherein a drive module consists of the sealing element and the cover as well as the drive, and said module is fastened to the valve housing or the sleeve-like housing section.

4. Shut-off valve according to claim 2 or 3, wherein the cover positions the sealing element on the sleeve-like housing section by fixing the fastening section or wherein the sealing element is connected in a firmly bonded manner to the fastening section on the sleeve-like housing section or the valve housing.

5. Shut-off valve according to one of claim 2 or 3, wherein a supply opening for control lines is provided on the cover, said supply opening is closed with a sealing element.

6. Shut-off valve according to claim 1, wherein the drive has a tubular, hose-shaped, rod-shaped, cage-shaped or plate-shaped heating element which is allocated to the setting element.

7. Shut-off valve according to claim 2, wherein the base of the sealing element, which points towards the valve seat, receives the valve closing member or is designed as the valve closing member.

8. Shut-off valve according to claim 7, wherein the valve closing member is designed to be disc-shaped, spherical, cylindrical or truncated cone-shaped and consists of plastic or wherein the valve closing member is formed by vulcanization as a disc-shaped sealing element.

9. Shut-off valve according to claim 1, wherein the bellows section is designed as a restoring element or the bellows section and the restoring element are aligned next to each other or are connected to each other to form a component and form one part of the restoring element.

10. Shut-off valve according to claim 2, wherein the drive comprises at least one setting element made from a shape memory alloy, and a tension rod, wherein the setting element is fastened to the cover, which is fastened to the sleeve-like housing section, and the setting element controls the tension rod with a setting movement.

11. Shut-off valve according to claim 1, wherein the restoring element is arranged in the regulation space.

12. Shut-off valve according to claim 10, wherein the cover, the at least one setting element and the at least one tension rod and a control unit that is in connection thereto form a structural unit.

13. Shut-off valve according to claim 10, wherein the sealing element, the cover, the at least one setting element and the at least one tension rod and a control unit that is in connection thereto form a structural unit.

* * * * *